Aug. 23, 1960  J. L. COLLINS ET AL  2,949,640
METHOD OF PRODUCING ELECTRIC CAPACITOR
Filed Sept. 24, 1953
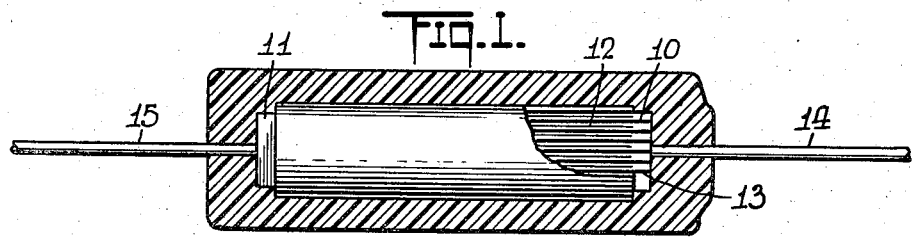
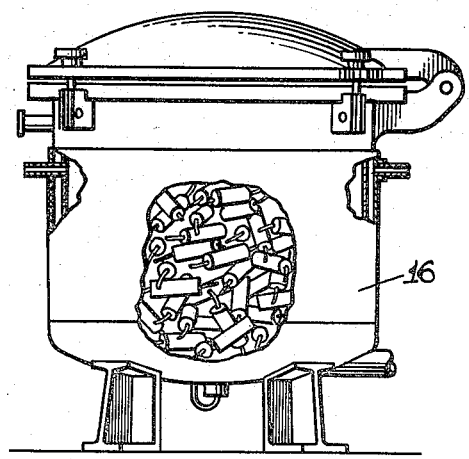
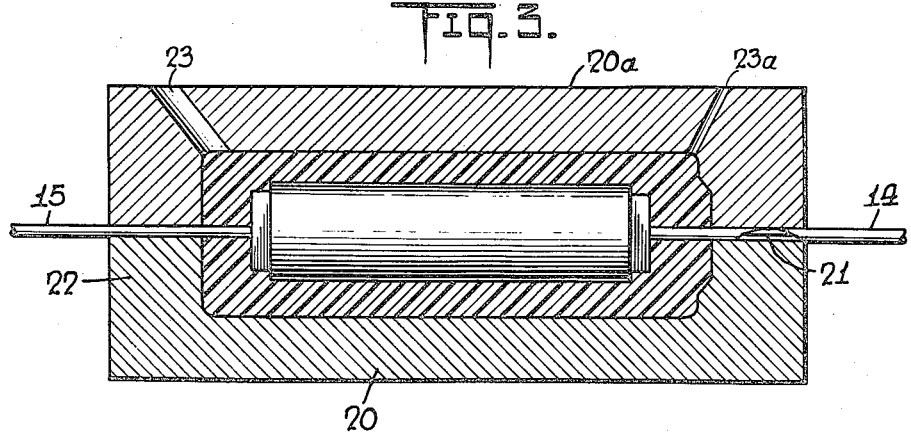
INVENTORS
Joseph L. Collins
Louis Kahn
BY
ATTORNEYS

United States Patent Office 2,949,640
Patented Aug. 23, 1960

2,949,640

METHOD OF PRODUCING ELECTRIC CAPACITOR

Joseph Leo Collins, Mattapoisett, and Louis Kahn, North Dartmouth, Mass., assignors to Aerovox Corporation, a corporation of Massachusetts Filed Sept. 24, 1953, Ser. No. 382,113

5 Claims. (Cl. 18—59)

The present invention is primarily concerned with electrostatic capacitors, such as paper wound, mica stack, ceramic and glass capacitors, and more especially with methods of making the same, although in certain aspects thereof it is of wider application for use also in electrostatic capacitors of the electrolytic type.

It is among the objects of the invention to provide a method of making a capacitor section of any of various otherwise known types, including among others, the conventional capacitor roll of metal foil and paper, which capacitor section incorporates a novel dielectric that imparts to the capacitor highly desirable properties, among which are excellent voltage, power factor, temperature and dielectric constant characteristics, said dielectric to admit of ready incorporation into the section structure, thoroughly to impregnate the paper or other porous interspacer commonly used, to effect a permanent bond that imparts a firm structure to the section and obviates undesirable variations in the electrical characteristics of the unit.

It is among other objects to provide a method of making an electrostatic capacitor with a casing structure which avoids on the one hand the high cost and bulk of a metal container and on the other hand the objections to even a carefully impregnated paper tube container (bearing in mind the need for pouring hot wax or pitch into the open ends of the paper tube, the reaction of such wax or pitch upon the capacitor impregnant, the softening or melting of the wax or pitch when the capacitor is subjected to high temperature in use, and the moisture vapor transmission and absorption of even the best commercial forms of such capacitors) which casing structure of the present invention is easy to apply in a single operation about the naked capacitor section, is impervious not only to water but also to oil and to gas and vapor, and resistant to acid and alkali, has high insulation resistance, negligible water absorption and and vapor transmission rate, suffers neither deformation nor shattering, nor even crazing under impact much more severe than encountered in practice, and which inherently affords a secure water, oil and gas-tight bond about the protruding terminals of the capacitor section encased therein, and which, unlike those heretofore in commercial use, far from deteriorating, actually improves in performance characteristics when subjected to long periods of high temperature operation, and which in fact has long life under sustained operating conditions at temperature as high as 125° C., conditions under which capacitors generally of the type heretofore in commercial use fail so quickly as to be impractical, and which is not impaired in its utility even after prolonged idleness in a humid environment but which is automatically and promptly restored to its original efficiency when put to its normal use under the usual temperature of the environment during such use.

Another object is to provide a method for making a capacitor structure having the above characteristics, both with respect to the capacitor dielectric and the capacitor casing and in which the dielectric and casing material will have no solvent, erosive or other harmful action upon each other, but are inherently interbonded for security and permanence in the construction of the capacitor.

The novel dielectric material incorporated in the capacitor section is a polymerizable, polyunsaturated, alkyd resinous product, preferably incorporated in an insulating interspacer between the electrodes and thoroughly filling the voids of such interspacer, said resinous product being polymerized to a solid, essentially insoluble and infusible state and thus bonding the various elements of the capacitor section into a firm and permanent structure.

For the desired combination of properties of the capacitor of the present invention, the polyunsaturated alkyd resin should be reacted to relatively low acid number below 20, and said alkyd resin should preferably be alcoholized and then acidulated to esterify and neutralize the free hydroxyl radicals. The lower the acid number, the better the power factor and the life of the capacitor. The use of as low an acid number as feasible moreover reduces the reactivity of the resin prior to complete polymerization with the metal which it engages, and the capacitor production is facilitated.

Polyunsaturated alkyd resins reacted to the desired low acid number, generally have a viscosity so high as not to admit of ready impregnation into a paper interspacer. In one aspect of the invention, the resin is combined with a compatible, free flowing liquid vinylidene, copolymerizable monomer which may be vinyl acetate, diallylphthalate, alpha methyl styrene or methyl methacrylate, but is preferably styrene. Such monomer in addition to controlling the viscosity, may impart other desirable characteristics to the dielectric material.

Sufficient monomer is added to the polyunsaturated alkyd resin to assure the fluidity required for ready and complete impregnation into the interstices of the paper interspacer of the assembled capacitor section when subjected to a drying and impregnating cycle including a vacuum treatment maintained in a conventional impregnation tank and at a temperature preferably well below 150° F.

Desirably the polymerizable polyunsaturated alkyd resinous product incorporates a catalyst, such as benzoyl peroxide, and/or activator, such as cobalt linoleate, which brings about the polymerization under conditions of temperature and time feasible for capacitor manufacture. The desired final electrical, chemical and physical properties are obtained with or without the presence of such catalyst or activator, and with or without the presence of a suitable inhibitor such as hydroquinone, desirably introduced into the mixture to preclude premature polymerization of the resin.

While the capacitor section prepared with the di-electric set forth could, after removal from the impregnating tank at near room temperature, be encased in any desired enclosure, including those of conventional construction, it is preferred to use as a casing a composition cast or molded about the capacitor section having a resin component similar to that of the dielectric. When such casing of the present invention is used, the cure of the capacitor impregnant may be effected as an incident to the cure of the casing itself, and the need for separately curing the section prior to encasing the same or as an additional operation when a conventional casing is employed is obviated. Preferably the polyunsaturated alkyd resin of the type used for impregnation of the capacitor section is modified for capacitor casing purposes to adapt it for the quick setting desirable in such casing structure by the omission of any inhibitor therefrom, and moreover has admixed therewith a suitable inert filler, such as finely divided calcium carbonate in proportion sufficient to insure on the one hand the desired viscosity to permit filling the mold cell without entrapping air bubbles, and on the other hand to avoid cracking or crazing in rapid hardening.

For casting or molding the case about the capacitor section, the casting composition of resin and filler mass is introduced into a mold cell into which the capacitor section has previously been introduced and said composition is allowed to harden about the capacitor section to a rock-like structure, completely, permanently and hermetically to enclose and enseal the section. The casing composition has a high coefficient of contraction, by virtue of which, upon setting, it snugly encompasses the individual terminals such as wire terminals that protrude therefrom and snugly presses against the encased disk heads of such terminals inherently to render the bond with respect thereto water, oil and gas tight, and this contraction occurs without fracture, cracking or crazing.

In the filling operation, according to one procedure, the molds are maintained sufficiently hot before pouring, so that the resin admixed with filler and catalyst, though used without an accelerator, will be cured by a short period of heating in a suitable oven.

According to an alternative procedure, heating of the molds is dispensed with and a suitable accelerator is used in the filling composition, which serves to initiate the polymerization, that then continues to completion by the exothermic reaction of polymerization, with a progressive rise of temperature, for complete cure in a matter of minutes.

As a further alternative procedure, a polymerization accelerator may be used in the casing composition of such character as to begin to function only after the temperature has been raised to a threshold value above the temperature at which the casing material is maintained prior to use. This latter method affords the advantage that the resin may be mixed with the accelerator in advance and stored for fairly long periods of time without danger of premature setting and yet the time required for cure is reduced to a fraction of that required were the use of an accelerator dispensed with.

By reason of the substantial identity chemically of the resin of the dielectric impregnant and that of the casing composition, no chemical interaction, such as a mutual solvent action or erosive action, does or can occur, nor does any physical interaction occur other than the desirable one of mechanical interbonding of casing and impregnant.

This application is a continuation-in-part of our joint application Serial No. 793,780, filed December 26, 1947, and entitled Electric Capacitor which application is now abandoned.

In the accompanying drawings in which are shown one or more of various possible embodiments of the several features of the invention.

Fig. 1 is a view in longitudinal cross section of a capaictor according to the present invention, Fig. 2 is a diagrammatic view, with parts broken away, showing the impregnation operation, and Fig. 3 is a view similar to Fig. 1 showing the encasing operation.

Referring now to the drawings, the capacitor section shown in its physical structure, apart from the dielectric, is entirely conventional. There is shown a non-inductively wound capacitor roll including two sheet metal, preferably aluminum foil electrodes 10 and 11, and one or more sheets 12 of paper interspacer interposed between the foils, and one or more further sheets 13 of paper superimposed over the foils, the stack of alternate foil and paper 10, 12, 11 and 13 being enrolled as shown, with the foil 10 protruding from one end of the cylindrical or flattened roll and the foil 11 from the opposite end thereof. Wire terminals 14 and 15 are electrically and mechanically connected in conventional manner, as by soldering to the protruding ends of the respective foils.

The capacitor sections of the conventional construction set forth are impregnated by subjecting the same to a drying and impregnation cycle. That cycle may be performed in various possible ways, of which one will be illustratively set forth, which utilizes two treating tanks, only one of which is shown at 16 in the drawings. Such cycle may involve the application of dry heat with the cover of the first tank (not shown) slightly open, to permit removal of water vapor, an operation that may be conducted, say for five hours, at a temperature desirably of 265 to 275 degrees F. The tank is thereupon closed and vacuum is applied for a period in the order of one hour with continued maintenance of such temperature, to drive off further water and air from the capacitor sections. After thereupon breaking the vacuum for one-half hour, vacuum is resumed for a prolonged period, say for 13.5 hours, 11 hours of which are at a maximum pressure of 250 microns under continued heating at said temperature of 265 to 275 degrees F. Thereupon the heat is shut off and the tank contents are cooled by passing cold water through the tank jacket for a period of three hours while maintaining the vacuum at 250 microns or lower, until the contained sections are cooled to the neighborhood of 70 degrees F.

The sections are then transferred to the clean impregnation tank shown at 16, to which vacuum of 250 microns is applied for about one hour at a maximum temperature of 70 degrees F., whereupon the vacuum valve is closed and the impregnating resin is admitted by opening the valve in the resin inlet line, care being taken to exclude air from such line. Vacuum is thereupon reapplied until a pressure is reached of 2000 microns or lower which is maintained for 45 minutes and then the vacuum is broken and the impregnated sections allowed to remain in the tank submerged in the resin for five hours or more before removal. The sections, upon removal from the impregnating tank may if desired be washed with styrene or other copolymerizable monomer that is used in impregnation in order to remove excess resin from the impregnated capacitor sections.

The capacitor sections will suffer no harm if they are permitted to remain unencased for a considerable length of time after impregnation, as distinguished from sections impregnated with conventional materials which may deteriorate if not promptly encased.

For casting the casing about the capacitor section, the section is laid in the lower half 20 of the casting mold cell, supported as shown by the wire terminals 14 and 15 resting in corresponding grooves 21 in the end walls 22 of the mold and thereby maintained spaced from the mold wall. The upper half 20ª of the mold registering with the lower half 20 has the gate 23 through which the casting composition hereinafter described is then poured into the mold which is vented at 23ª, the wall of the mold being first coated with a suitable lubricant to prevent adhesion.

The casting procedure may be conducted according to any of three general alternative methods which will now be briefly set forth.

(1) The casting mold cells are preheated to a temperature in the order of 100 degrees C. and maintained heated prior to and during pouring and the casting composition of the resin, filler and catalyst set forth, but devoid of inhibitor, is poured into the mold about the section therein in the absence of any accelerator. The filled mold is then placed in an oven for curing at a temperature starting at about 55 degrees C. and progressively rising to about 120 degrees C., although somewhat higher temperatures would be used where larger sections are molded and this curing operation will be completed in approximately 20 to 40 minutes.

(2) According to this method, the molds are not preheated and an accelerator is used in the casting composition which accelerator serves to initiate the polymerization that thereupon continues under the heat developed by the exothermic reaction of such polymerization. That reaction is cumulative, starting slowly and accelerating rapidly to completion with rise in temperature during the process, to values in the order of 100 to 200 degrees C., depending upon the size of the section, the amount of casting material and the size and material of the mold. The entire cure takes but a few minutes, usually approximately 5 minutes. To guard against polymerization in the mixing pot, the accelerator should be introduced into the casting composition only as the same is about to be poured into the casting mold cell.

(3) According to this method, a special accelerator is used, such as a 20 percent solution of stannous chloride in ethylene glycol, which is substantially inoperative at temperature below a minimum or threshold value well above the temperature at which the material is handled prior to filling the mold. Accordingly, by this procedure, unlike that described in the previous paragraph, the resin may be mixed well in advance and stored for fairly long periods of time, up to as much as 24 hours and accordingly the time required for the cure is only from 25 to 50 percent of that required where the accelerator is not used.

Thus, by any of the foregoing three methods, the output rate is high, but it is especially high where the second method is used, although the third method may be preferably by reason of the convenience it affords in avoiding the need for introducing the accelerator only as the composition is about to be poured into the casing mold cell.

In the operation, according to any of the three methods set forth, the casing material upon completion of the cure is a hard rock-like substantially impervious infusible and insoluble unit. By reason of the high coefficient of contraction of the casting composition, the same becomes tightly contracted about the protruding terminals 14 and 15 in cooling and setting to render the mechanical bond about said terminals impervious to water, oil and gas.

No untoward reaction between the impregnated dielectric and the casing structure, such as mutual solvent action or erosion, can ever occur, because substantially the same resins are used for impregnant and casing. There is no chemical interaction between the casing and the section or its impregnant and no physical interaction other than mechanical interbonding action which is highly advantageous. The casing as contracted about the encompassed section never relaxing its pressure, the section is not subjected to disturbing influences that might adversely affect its performance. In fact, the capacitor improves with age as its impregnant hardens.

A capacitor prepared by the method above described is characterized by extraordinary constancy in its performance, which is due to the substantially impervious and invariant character of the rock-like casing which will remain unaffected regardless of the environment in which it is used, whether wet or dry, acid or alkaline, high pressure or vacuum. Moreover, regardless of the severity of impact to which the unit may be subjected under severe conditions of service, it will neither disintegrate nor shatter, nor even show evidence of minute fissures, so that the protection of the contained capacitor section is complete for all practical purposes.

The formulation of the resin used according to the present invention and the mode of preparation and treatment thereof will now be set forth in greater detail:

The unsaturated alkyd resins which are used in accordance with our invention, may be formed by reacting a mixture of polyhydric alcohols and polybasic acids, at least one alcohol or acid of which is unsaturated.

It is of course manifest that when saturated polyhydric alcohols are used in making the unsaturated alkyds, the polybasic acid or mixture of acids used in the reaction to form the alkyd would include an unsaturated acid or mixture of acids which are capable of forming an unsaturated alkyd with the polyhydric alcohol. Likewise, when saturated polybasic acids are used in making the unsaturated alkyds, the polyhydric alcohol or mixture of alcohols used in the reaction to form the alkyd would include an unsaturated alcohol or mixture of alcohols which are capable of forming an unsaturated alkyd with polybasic acid.

The saturated polyhydric alcohols which may be used with unsaturated polybasic acid in forming the unsaturated alkyds described above are preferably the lower glycols containing from two to four carbon atoms between a pair of alcoholic hydroxy groups, such as ethylene glycol, 1,2 propylene glycol, isobutylene glycol, trimethylene glycol, 1,4 butylene glycol, phthalyl alcohol, and the like. Other saturated polyhydric alcohols which may be used are glycerol, alphamethylglycerol, pinalcol, sorbitol, mannitol, erythritol, pentaerythritol, diethylene glycol, pentamethylene glycol, triethylene glycol, tetramethylene glycol, hexamethylene glycol, and the like.

Unsaturated polyhydric alcohols which may be used with saturated polybasic acids to produce the unsaturated alkyd resins are unsaturated glycols such as vinyl glycol

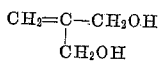

or the compound:

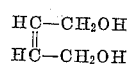

The preferred unsaturated acids which may be used with saturated polyhydric alcohol in making the alkyds are the alpha, beta, unsaturated polycarboxylic acids or anhydride thereof such as maleic, fumaric, itaconic, citraconic, acetylene dicarboxylic, glutaconic, methylene malonic, mesaconic acids or mixtures thereof. Other polycarboxylic unsaturated acids may be used as may also mixtures of unsaturated polycarboxylic acids and saturated polycarboxylic acids such as phthalic acid or phthalic anhydrid, succinic, adipic, azalic, sebacic, malonic and the like.

The characteristics of these unsaturated alkyds may be modified by including as a reactant, a monohydric alcohol such as allyl, methallyl, crotyl, beta ethallyl, propargyl, tiglygl, citronellyl, oleyl, and the like unsaturated monohydric alcohols, or by including in the reaction mixture, a saturated monohydric alcohol, such as methyl, ethyl, propyl, butyl, etc. The characteristics of these unsaturated alkyds may also be modified by including in the reaction mixture monocarboxylic acids such as acetic acid, propionic acid, acrylic acid, methacrylic acid, alpha-chloroacrylic acid, butyric acid, oleic acid, linoleic acid, linolenic acid, benzoic acid and the like.

The outstanding advantages of these unsaturated alkyds for the dielectric purposes of the present invention are obtained when the reaction is carried out until the acid number thereof is below about 20 as above indicated. The lower the acid number the better the power factor of the capacitor and the longer its useful life. An acid number of about 5 is deemed best for practical purposes, since the cost of bringing the acid number even lower is frequently not justified by any further improvement in the characteristics of the capacitor.

In general, the use of unsaturated alkyds having an acid number as low as above indicated is not, in the absence of other processing thereof, practicable for impregnation, because such alkyds ordinarily are of very high viscosity and are not very amenable to being handled without copolymerizable monomers such as styrene and the like.

Superior chemical and physical properties, as well as better compatibility with copolymerizable monomers, such as styrene, can be obtained if the alkyds above described are alcoholized. Some of the alcohol used in such alcoholysis treatment may be introduced into the alkyd, the amount so introduced depending largely upon the duration of the alcoholysis treatment. It is preferred that the amount of alcohol so introduced into the alkyd should not exceed 0.75 mol, and preferably should be no more than 0.5 mol and no less than 0.02 mol of alcohol per mol of acid or mixture of acids used in making the alkyd. The alcohol which may be used in the alcaholysis may be alkyl alcohol, methallyl alcohol, methyl alcohol, ethyl alcohol, propyl alcohol, butyl alcohol, and the like, and even polyhydric alcohols for example, glycerol may be used for such alcoholysis.

For making the preferred unsaturated alkyds for use as a dielectric in accordance with the present invention, any unreacted alcohol present in the alkyd following the alcoholysis step is removed as by a topping procedure. Thereupon, the alcoholized alkyd is preferably acidulated to esterify and neutralize the free hydroxyl radicals. Any suitable acid may be used to effect this acidulation, but it is preferred to use an organic acid which is free from alcoholic hydroxy groups. Any suitable monocarboxylic acid or anhydride will serve, such as acetic acid, propionic acid, acrylic acid, methacrylic acid, oleic acid, cinnamic acid, benzoic acid, chloroacetic acid and the like.

The exact nature of the reaction involved in the alcoholysis step has not been determined due to the complexity of the molecules that are involved, but it is believed that the alcohol breaks the molecular chains of unsaturated alkyds to shorter molecular linkages, thereby effecting the reduction in viscosity referred to above.

Conventional procedures may be employed in preparing the unsaturated alkyds described above. In the case of the preferred unsaturated alkyd, it is preferred that the alcoholysis be carried out under reflux, under such conditions that no substantial portion of the reactants or reaction products are removed from the system during the reaction.

The various reactions herein described may be conducted in an inert atmosphere by bubbling carbon dioxide through the reaction mixture. Polymerization inhibitors such as tertiary butyl catechol, hydroquinone, diphenylamine, and the like, may be incorporated to inhibit polymerization during processing.

The copolymerizable monomers with which the polymerizable polyesters or unsaturated alkyds hereinabove described may be copolymerized is a free flowing vinylidene liquid compatible with the alkyd and may be vinyl acetate, styrene, acrylo-nitrile, methyl, butyl, allyl, crotyl or methallyl acrylates, alpha chloroacrylate, methacrylate, glycol diacrylate or other polymerizable materials, including diallyl phthalate, diallyl, dimethallyl, divinyl, di-isopropanyl or dicrotyl carbonate or other corresponding unsaturated alcohol polyesters of polybasic acids such as phthalic, maleic, oxalic, citric, tartaric, succinic, adipic and the like.

The resin mixtures described above may be copolymerized for purposes of the present invention by means of heat or light, but preferably with polymerization catalysts such as benzoyl peroxide, lauroyl peroxide, tertiary butyl hydrogen peroxide, methyl ethyl ketone peroxide, 1-hydroxy cyclohexyl hydrogen peroxide, ditertiary butyl hydrogen peroxide and similar active peroxides.

The rate of polymerization may be markedly increased at lower temperatures than otherwise required by the introduction of activators, such as cobalt linoleate, cobalt naphthenate cuprous oxide, triethanolamine, stannous chloride and other materials known to be suitable for the purpose.

While the unsaturated alkyds described above that have not been subjected to the alcoholysis and acidulation treatments set forth are miscible to more or less extent with many of the above polymerizable materials, the preferred alcoholized and acidulated unsaturated alkyds are miscible with the above polymerizable materials in substantially greater proportions. For example, one part by weight of an unsaturated alkyd prepared from maleic or fumeric acid and diethylene glycol is compatible with less than 0.2 part by weight of monomeric styrene, whereas a similar alkyd that has been subjected to the alcoholysis and acidulation treatments as above described, is compatible with monomeric styrene in substantially all proportions. The polymerizable monomer such as styrene may constitute in the order of 20 to 70 percent by weight of the resin. It is preferred to use a proportion of styrene of about 40%, because this value affords maximum dielectric constant with minimum power factor.

An illustrative suitable formulation useful for electric capacitors according to the present invention, comprises ethylene glycol as the saturated polyhydric alcohol, and phthalic and maleic acid anhydride as the polycarboxylic acid reacted in equimolar proportions, admixed with styrene.

The following specific examples are illustrative of methods of preparing the preferred unsaturated alkyds for use in electric capacitors in accordance with the present invention. In these examples, the term "parts" refers to parts by weight:

*Example 1*

1 mol of phthalic anhydride, 10 mols of maleic anhydride and 11 mols of ethylene glycol are reacted together until the acid number has been reduced to 82, which is reached after heating for four hours at 185 degrees C. Approximately 7 parts of the resulting product are added to one part of normal propanol and the mixture heated under a reflux condenser with agitation for six hours at a temperature which gradually rises from 123 degrees to 183 degrees C. Carbon dioxide is bubbled through the mixture to maintain an inert atmosphere within the reaction vessel. 33 parts of this product, which has an acid number of about 60, are mixed with 2 parts of acetic anhydride and heated under a reflux condenser at 135 degrees C. with agitation in an inert atmosphere for three hours. The resulting composition when heated at 185 degrees C. for four hours under a pressure of 2 mm. of mercury, is a viscous liquid with an acid number of about 19 which polymerizes readily.

*Example 2*

10 mols of phthalic anhydride, 10 mols of maleic anhydride and 22 mols of ethylene glycol are reacted together to an acid number of 54 which is reached after heating for four hours at 185 degrees C. Approximately 7 parts of the resulting product are added to one part of normal propanol and the mixture heated under a reflux condenser with agitation for six hours at a temperature which gradually rises from 123 degrees to 183 degrees C. Carbon dioxide is bubbled through the mixture to maintain an inert atmosphere within the reaction vessel. The resulting composition is then topped by heating at 185 degrees C. for four hours under a pressure of 2 mm. of mercury, yielding a viscous liquid with an acid number of about 5 which polymerizes readily.

*Example 3*

10 mols of phthalic anhydride are reacted with 22 mols of propylene glycol and heated to an acid number of 50. Then 10 mols of maleic anhydride are added and the mix heated under a reflux until the acid number comes down to about 20. The mix is then topped under high vacuum to an acid number of about 2.6.

The formulations of any of the foregoing illustrative examples would be utilized in the electric capacitor art by admixing with the polyunsaturated alkyd resin sufficient polymerizable monomer, preferably styrene, to constitute 20 to 70 percent, preferably about 40 percent by weight of the mixture, and also adding in the order of 1.5 parts of suitable catalyst, such as benzoyl peroxide. Preferably 65 to 75 parts of styrene are used for each 100 parts of the polyunsaturated alkyd resin, that is, about 40 percent of the mixture is styrene.

The mixture of polyunsaturated alkyd resin, polymerizable monomer and catalyst, is desirably further modified to adapt it respectively for impregnation of capacitor sections and for encasing capacitor sections.

For the impregnation purposes, as above noted, the resin is reacted, as previously described, to an acid number below about 20 and preferably to as low as 5 and in addition to the catalyst, a suitable inhibitor such as hydroquinone, is added to prevent premature polymerization or setting.

The casing composition utilizes basically the same unsaturated alkyd resin as is used for impregnation, but mixed with inert filler. Unlike the impregnation resin which includes an inhibitor to guard against polymerization, such inhibitor is here omitted, so that the polymerization and cure may be relatively speedy and the mixture may rapidly be set about the capacitor section.

Preferably the inert filler which is desirably of finely divided calcium carbonate, magnesium carbonate, silica, diatomaceous earth, or the like may be roughly equal in weight to the resin mixture or desirably may be in amount a little in excess of that of the resin mixture employed. Where too little filler is used, excessive contraction and cracking of the case may result, and where too much filler is used, the mixture may become too viscous to flow readily and may tend to entrap air bubbles.

The casing mixture is introduced and polymerized about the section according to one of the three alternative procedures above set forth.

Capacitors impregnated according to the teachings above set forth are found to have the following characteristics:

(1) Dielectric strength of the finished capacitor structure of the order of 2,000 volts per mil or higher.

(2) Temperature characteristics with a falling off in capacitance of not more than 15 percent in the range from room temperature to minus 40 degrees C. and an increase of capacitance of not more than 7 percent in the range from room temperature to 100 degrees C.

(3) Dielectric constant of the composite dielectric of the order of 5.

(4) Power factor of the order of 1 percent at room temperature and well under 5 percent throughout the range from minus 40 degrees C. to plus 100 degrees C.

(5) Long life under severe operating conditions better than those of corresponding capacitors impregnated with commonly used impregnants, such as Halowax, mineral oil, castor oil or chlorinated diphenyl.

(6) Long life under prolonged service at temperature as high as 125 degrees C. at which temperature capacitors impregnated with familiar impregnant promptly fail.

The capacitor unit impregnated and encased according to the method of the present invention has all of the electrical characteristics above set forth and has the further advantage that the casing and impregnant will not react upon each other chemically and will become interbonded but will not otherwise physically affect each other, so that the gradual deterioration incurred in capacitors in which such reaction may take place, is completely obviated. The casing of capacitors prepared by the present method has high insulation resistance. Its water absorption and vapor transmission are at rate so low as to be negligible for all practical purposes. For all practical purposes, the casing is impervious to water, oil, gas and vapor, is insoluble in acid or alkali and is substantially infusible. Even under severe impact, much severer than any likely to be encountered in use of the capacitor, there will be no deformation, shattering or even minute cracking or crazing of the casing. Moreover, the bond of the polymerized casing against and about the terminal structure is snug and mechanically secure and water, oil and gas tight. Where a wire terminal for instance is equipped with a disk head against the capacitor section, the casing of high coefficient of contraction, not only presses such disk inward against the section, but snugly encompasses the root end of the wire length for enhanced fluid tightness. The sustained pressure exerted by the polymerized casing about the contained capacitor section retains the same against fortuitous variation so that the electrical properties thereof above set forth are maintained.

Capacitors made according to the present invention maintain surprising excellence of performance and long life when subjected for prolonged periods to a temperature as high as 125 degrees C., in excess of the highest temperature hereto claimed in the art, at voltage far in excess of rated voltage and even at voltage as high as twice rated voltage. The life of such capacitors under such severe conditions of operation is no shorter than that of conventional capacitors under ordinary conditions of use at normal temperatures and normally rated voltage.

Under severe conditions of service the capacitors preferred according to the present invention actually improve. By way of example after 650 hours of operation, on life test at twice rated voltage and at a temperature of 85 degrees C., the insulation resistance of the capacitor was found to rise rather than to drop and in fact to rise to two and one-half times its original value. In extensive tests, the original insulation resistance of an average of 28,000 megohms was found to rise to 70,000 megohms. Concurrently with such rise in insulation resistance, the capacitor enjoyed a material improvement in power factor, dropping from an average of 1.2 to an average of 0.8.

On standing for prolonged periods of idleness in an environment of humidity so high as to effect a falling off in the insulation resistance of a capacitor section prepared according to the present invention, the original high value of insulation resistance was restored by merely heating the same moderately for a short period of time measured in minutes at a temperature of say 85 to 100 degrees C., heating that automatically occurs when the usual equipment of which the capacitor is a part is put into circuit and operated for a short time.

The above characteristics are of importance in numerous fields in which capacitors are used, among others, in radio receiving and transmitting sets, in guided missiles, in high speed jet-propelled planes, and in electrical equipment generally that incorporate capacitors subjected to considerable heat engendered under conditions of operation. A radio receiver set, for instance, may be exposed to a humid atmosphere for long period of non-use, permanently disabling an ordinary capacitor, say a paper-encased capacitor which would then have to be replaced. The tubes of a radio receiver incorporating the capacitors of the present invention on the other hand generate sufficient heat in operation promptly to restore the capacitors to their original characteristics.

The foregoing advantage is strikingly utilized in the design of radio receiver and electronic equipment generally. Where heretofore, by reason of the vulnerability of capacitors to heat, they were shielded by placing them as far as possible from the heated tubes in order to prolong their life, this precaution is not necessary where capacitors of the present invention are used. On the contrary, it is advantageous in the use of the capacitors of the present invention to place the same in close proximity to the tubes where they are exposed to the heat thereof, since as above noted, the capacitors improve under such heat action and this circumstance renders feasible the design of more compact equipment than was heretofore commercially feasible. The proximity of the capacitors to the source of heat rendered possible by the present invention moreover greatly improves the efficiency of the equipment in many applications by dispensing with the need for the long lead connections to capacitors of the type that must be installed remote from the source of heat and thus does away with the objections to distributed capacitance and distributed inductance which have heretofore been a bugbear in sensitive electronic equipment.

It will be understood that, while in the drawings, a casting mold has been specifically shown and in the text has been frequently mentioned, the casing material may be applied by other molding procedures including injection molding or compression molding and that there are other methods by which the casing material may be applied as for instance by dipping or spraying.

It will be apparent from the foregoing that the thermosetting polyunsaturated alkyd resin used for the casing is not limited in its utility for the usual fixed electrostatic capacitors such as paper wound, mica stack, ceramic and glass capacitors, but serves also for the casing of so-called dry electrolytic capacitors, it being understood that for such latter use, a suitable venting means may be incorporated in the casing. The casing material in addition to the desirable characteristics above set forth also possesses further unusual characteristics which make it outstandingly suitable for the encasing of electrolytic capacitors, in that it is not deleterious to the dielectric film and film forming metals, such as aluminum, or to the electrolytes used in such capacitors, and the flowing and setting temperature of the resin is not so high as to upset the moisture balance required in such electrolytes.

As many changes could me made in the above method and capacitor, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of impregnating an electrostatic capacitor section that consists essentially of a roll composed of electrodes with intervening and encompassing paper sheets, and terminals protruding therefrom by an impregnating cycle which comprises evacuating the section of air and moisture and introducing into the section under vacuum a mixture of polyunsaturated alkyd resin, alcoholized and acidulated and reacted to an acid number below 20 with a compatible free flowing liquid copolymerizable monomer and inhibitor at a temperature below 150 degrees F.

2. The method recited in claim 1 in which the copolymerizable monomer is styrene and in which styrene is further used to wash the sections after removal from the impregnation cycle.

3. The method of curing the impregnant recited in claim 1 and at the same time forming an insoluble, infusible casing about the same which comprises disposing the section in a casting mold cell with the protruding terminals supporting the capacitor section, charging the mold with substantially the same polyunsaturated alkyd resin as recited in claim 1, but admixed with filler and effecting polymerization of the resin impregnating the capacitor section as well as that cast in the mold to the desired substantially insoluble and infusible state in which the latter effectively presses against and grips the protruding terminals.

4. The method of curing the impregnant recited in claim 1 and at the same time forming a hard, insoluble infusible casing about the same, which comprises disposing the section in a mold cell with the terminals protruding therefrom and mechanically sustaining the capacitor section spaced from the mold wall, charging the mold with casing composition consisting essentially of substantially the same polyunsaturated alkyd resin as recited in claim 1, catalyst therefor and inert filler, and effecting polymerization of the resin in the mold to the desired hard, insoluble and infusible state with contraction of such casing composition, effectively to press against and to encompass and grip the protruding terminals.

5. The method of impregnating and encasing a capacitor section having porous interspacers and protruding terminals, which comprises utilizing both as impregnant for said interspacer and as casing material a composition comprising a mixture of polyunsaturated alkyd resin which has been reacted to an acid number below 20, a compatible, liquid copolymerizable vinylidene monomer and catalyst, in which the capacitor section is impregnated with such mixture in the presence of an inhibitor under vacuum at temperature not over 150 degrees F. and in which substantially such mixture in the absence of inhibitor and admixed with inert filler is applied about the previously impregnated section and about the inner ends of its terminals and the impregnant of the encased and contained capacitor section are simultaneously subjected to ageing.

References Cited in the file of this patent

UNITED STATES PATENTS

| | | |
|---|---|---|
| 877,089 | Koch | Jan. 21, 1908 |
| 2,355,788 | Dunleavey | Aug. 15, 1944 |
| 2,407,479 | D'Alelio | Sept. 10, 1946 |
| 2,414,525 | Hill et al. | Jan. 21, 1947 |
| 2,418,633 | Gould | Apr. 8, 1947 |
| 2,456,381 | Clark | Dec. 14, 1948 |
| 2,464,568 | Flynn et al. | Mar. 15, 1949 |
| 2,484,215 | Foster | Oct. 11, 1949 |
| 2,511,436 | Kauth | June 13, 1950 |
| 2,526,688 | Robinson | Oct. 24, 1950 |
| 2,628,271 | Brafman | Feb. 10, 1953 |
| 2,713,700 | Fisher | July 26, 1955 |